No. 751,280. Patented February 2, 1904.

UNITED STATES PATENT OFFICE.

CALOCERO GIGLIO AND BACHIR ZAOUCHE, OF PARIS, FRANCE.

AGGLOMERATING COMPOUND FOR AGGLOMERATING PULVERULENT MATERIALS.

SPECIFICATION forming part of Letters Patent No. 751,280, dated February 2, 1904.

Application filed July 7, 1903. Serial No. 164,553. (No specimens.)

*To all whom it may concern:*

Be it known that we, CALOCERO GIGLIO, a citizen of Italy, and BACHIR ZAOUCHE, a citizen of Tunis, both residing at Paris, in the Department of the Seine, France, (whose post-office address is 19 Rue Cambon, Paris, France,) have invented new and useful Improvements in Agglomerating Compounds for Agglomerating Pulverulent Materials, of which the following is a specification.

This invention relates to agglomerating compounds for agglomerating pulverulent materials, particularly coal-dust, with or without pressure.

This agglomerating composition is composed of the following ingredients mixed together in adequate proportions: torrefied potato fecula, common gas-pitch, acetic acid, (vinegar,) tallow, (either vegetable or animal,) common glue, and Turkish glue, called "chiriche." Common resin may be used instead of gas-pitch.

As an illustration of the manufacturing process of our agglomerating composition we hereinafter give an example, it being understood that we shall not be compelled to confine ourselves to this unique *modus operandi:* Two kilograms of torrefied potato fecula are added to one hundred liters of ordinary boiling water in order to form a solution. A second solution is prepared by dissolving fifteen kilograms of pitch or resin in three liters of vinegar or common acetic acid diluted at 50°. A third solution, which has to be prepared warm, is obtained by dissolving in two kilograms of softened common glue one kilogram of tallow (either vegetable or animal) in order to maintain its fluidity. Vegetable tallow is a granular product very common in India and the Orient, which can be obtained at a very low cost. These two solutions are mixed together at their respective temperatures, when three kilograms of chiriche Turkish glue are then added, so as to form a paste consistent at an ordinary temperature. This last-mentioned glue is a natural vegetable product usually obtained in the form of powder. When required for use, this mass will have to be submitted to a heat of 100°, and when thus softened the first solution of torrefied potato fecula is then gradually incorporated to it. The agglomerator thus obtained may then be mixed, either warm or cold, to be amalgamated with the pulverulent matter. The proportion of eight per cent. ought to be observed should coal or pit-coal dust have to be treated. Bricks of all sizes and shapes are manufactured in this way either by help of machines especially constructed for the purpose or by any other means.

What we claim as our invention, and desire to secure by Letters Patent, is—

An agglomerating compound for the agglomeration of all pulverulent material, consisting of the following ingredients mixed together in adequate proportions: torrefied potato fecula, common gas-pitch, acetic acid, tallow, common glue and Turkish glue.

In testimony whereof we have signed this specification in the presence of two subscribing witnesses.

CALOCERO GIGLIO.
BACHIR ZAOUCHE.

Witnesses:
   AUGUSTUS E. INGRAM,
   HENRY DANBERY.